No. 759,860. PATENTED MAY 17, 1904.
A. BYINGTON.
LUBRICATOR.
APPLICATION FILED AUG. 27, 1903.
NO MODEL.
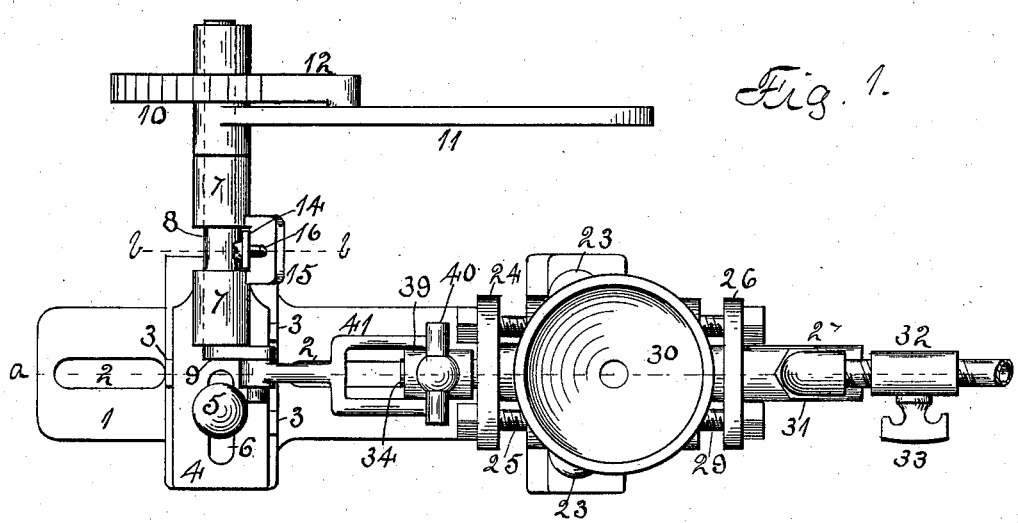
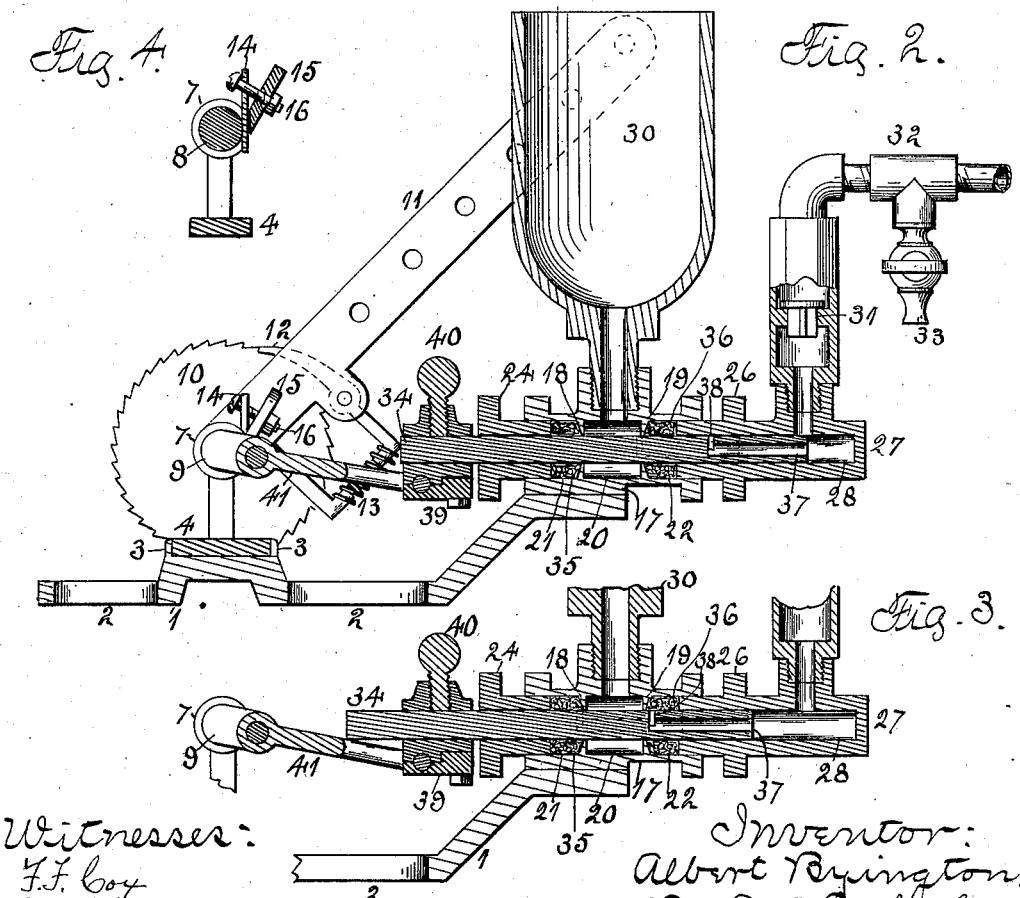

No. 759,860.

Patented May 17, 1904.

UNITED STATES PATENT OFFICE.

ALBERT BYINGTON, OF ROCHELLE, ILLINOIS.

LUBRICATOR.

SPECIFICATION forming part of Letters Patent No. 759,860, dated May 17, 1904.

Application filed August 27, 1903. Serial No. 170,933. (No model.)

*To all whom it may concern:*

Be it known that I, ALBERT BYINGTON, a citizen of the United States, residing at Rochelle, in the county of Ogle and State of Illinois, have invented certain new and useful Improvements in Lubricators, of which the following is a specification.

The object of this invention is to construct a lubricator which is positive in its action and which can be adjusted to deliver any quantity of oil between the maximum and minimum amounts, the stroke of the piston remaining the same at all times.

In the accompanying drawings, Figure 1 is a plan view of my improved lubricator. Fig. 2 is a vertical lengthwise section on dotted line *a*, Fig. 1. Fig. 3 is a similar section. Fig. 4 is a transverse section on dotted line *b*, Fig. 1.

The base-plate 1 has slots 2, through which the bolts securing it in position extend. Three projections 3 extend from the upper face of the base-plate and serve to guide the cross-support 4, which is clamped to the base-plate by the bolt 5, extending through the slot 6 in a manner to admit of the support being adjusted transversely of the same plate. This cross-support has bearings 7 connected to it, and these bearings support a shaft 8, having a crank 9 at one end and a ratchet-toothed wheel 10 at its other end. An intermittent rotary movement is imparted to the ratchet-toothed wheel by a lever 11, supporting a dog 12, which is held in engagement with the teeth by the spring 13, so that as the lever is oscillated the dog will engage the teeth of the wheel and partially rotate the wheel. The extent of the movement of the lever regulates the advancing steps of the wheel. The lever has a connection with some moving part of the machine or engine.

In order that the ratchet-toothed wheel may be held stationary while the dog is clicking over the teeth to take a new hold, a spring-plate 14 rests against the shaft and against the edge of the wing 15, extending from the bearings 7, and its upper end has a connection with the wing 15 by a screw-bolt 16, and as this bolt is turned up the friction of the lower end of the plate against the shaft 8 will be increased.

The main chamber 17 of the lubricator has a lengthwise bore divided by partitions 18 and 19 into a center section 20 and two end sections 21 and 22. This main chamber has a connection with the base-plate by the bolts 23. A gland 24, having a central opening, is located in the section 21 and connected to the main chamber by the screws 25. A gland 26 has an extension 27, provided with a cavity 28, and the gland extends into the section 22 and is connected to the main chamber by the screws 29. An oil-reservoir 30 has a connection with the main chamber. A check-valve 31 has a connection with the extension 27, and the piping 32 leads to the parts to be lubricated. A drip-cock 33 has a connection with the piping. A piston 34 is supported by the glands 24 and 26. Packing 35 is placed around the piston between the end of the gland 24 and the partition 18, and packing 36 is placed around the piston between the end of the gland 26 and partition 19. This piston has a lengthwise bore 37, communicating with a cross-opening 38. A clamp 39 has a connection with the piston by the screw 40, and a connection is formed between the clamp and crank 9 by the yoke 41.

A connection is formed between the lever 11 and some moving part of the machine or engine to be lubricated. An intermittent rotary movement will be imparted to the crank 9, and in turn an intermittent reciprocating movement will be imparted to the piston. Oil is placed in the reservoir and will fill the center section 20 of the main chamber. As the piston reciprocates the cross-opening will be brought into the center section 20, thereby allowing oil to rush through the bore 37 into the cavity 28 in the extension 27. This rush of oil is caused by the outward movement of the piston creating a vacuum in the cavity 28.

During its inward movement the piston will pass freely through the oil in the center section and will cause an amount of oil in the cavity equal to the displacement of the piston to return to the center section until the cross-opening 38 moves under the packing 36, when the further movement of the piston will force oil past the check-valve to the parts to be lubricated. This operation is repeated at each complete reciprocation of the piston.

At Fig. 2 the connection of the piston with the clamp is such that the cross-opening 38 is brought into the center section only far enough to permit the oil to pass through the center bore and fill the vacuum in the cavity and only a short inward movement of the piston is necessary to bring the cross-opening under the packing 36, so that the remainder of the inward movement of the piston will force oil displaced by the piston past the check-valve.

By adjusting the piston in connection with the clamp 39, as shown at Fig. 3, the cross-opening 38 of the piston will be in the center chamber a greater part of the inward movement of the piston and in engagement with the packing only a small part of such movement, whereby only a small amount of oil will be forced past the check-valve, and by adjusting the piston in connection with the clamp any amount of oil between the maximum and minimum can be forced past the check-valve at each inward movement of the piston. It will be noticed that the extent of the reciprocating movement of the piston is the same irrespective of the connection between the piston and clamp.

I claim as my invention—

In a lubricator, the combination of a vertically-arranged oil-reservoir, a horizontally-arranged oil-chamber located beneath the oil-reservoir and having a vertical communicating passage-way, there being two vertically-arranged partitions, one located each side of the passage-way and each provided with a central opening, said partitions tapering in thickness being thinner at the openings, a gland for each end of the chamber, a movable piston passing through the glands and vertical partitions, and having a lengthwise bore and a transverse opening communicating with the bore, packing located around the piston between the glands and vertical partitions, and means for reciprocating the piston, whereby the transverse opening of the piston moves in contact with one of the packings, thereby cutting off communication between the transverse opening and the oil-chamber.

ALBERT BYINGTON.

Witnesses:
W. P. GRAHAM,
O. A. WEDLER.